US011423211B2

(12) United States Patent
Rubin

(10) Patent No.: US 11,423,211 B2
(45) Date of Patent: Aug. 23, 2022

(54) TRANSFORMATIONAL RANDOMIZATION FOR ENHANCED ARTIFICIAL INTELLIGENCE CAPABILITIES AND DIAGNOSTIC TUTORING

(71) Applicant: Naval Information Warfare Center, Pacific, San Diego, CA (US)

(72) Inventor: Stuart H. Rubin, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 560 days.

(21) Appl. No.: 16/665,409

(22) Filed: Oct. 28, 2019

(65) Prior Publication Data

US 2021/0124797 A1    Apr. 29, 2021

(51) Int. Cl.
*G06N 20/00* (2019.01)
*G06F 40/16* (2020.01)
*G06N 7/00* (2006.01)
*G06F 17/18* (2006.01)
*G06F 40/20* (2020.01)

(52) U.S. Cl.
CPC ............. *G06F 40/16* (2020.01); *G06F 17/18* (2013.01); *G06F 40/20* (2020.01); *G06N 7/005* (2013.01); *G06N 20/00* (2019.01)

(58) Field of Classification Search
CPC .................................................. G06N 20/00
See application file for complete search history.

(56) References Cited

U.S. PATENT DOCUMENTS

| | | |
|---|---|---|
| 5,627,945 A | 5/1997 | Cohen |
| 6,990,670 B1 | 1/2006 | Hodjat |
| 7,047,226 B2 | 5/2006 | Rubin |
| 7,613,666 B1 | 11/2009 | Baisley |
| 7,925,496 B1 | 4/2011 | Rubin |
| 7,925,605 B1 | 4/2011 | Rubin |

(Continued)

OTHER PUBLICATIONS

S. Rubin et al., "Modeling Human Cognition Using a Transformational Knowledge Architecture," IEEE, published 2008 (Year: 2008).*

(Continued)

*Primary Examiner* — Eric J Yoon
(74) *Attorney, Agent, or Firm* — Naval Information Warfare Center, Pacific; Kyle Eppele

(57) ABSTRACT

Actions may be automatically determined by a machine learning system using transformational randomization. A situation set and an action sequence associated with contexts of a computer-implemented application may be obtained. Left-hand side (LHS) equivalence transformations and right-hand side (RHS) equivalence transformations are obtained based on a set of a plurality of rules for the application. LHS randomizations are obtained based on combining the plurality of LHS equivalence transformations. RHS randomizations are obtained based on combining the plurality of RHS equivalence transformations. A randomized context is obtained based on the LHS randomizations, and an action sequence is determined based on the context randomization. A randomized action sequence is obtained based on the RHS randomizations. A valid action is determined based on a probability value of a randomized rule associated with the randomized action sequence.

20 Claims, 4 Drawing Sheets

(56) References Cited

U.S. PATENT DOCUMENTS

| | | | |
|---|---|---|---|
| 8,280,831 B1 * | 10/2012 | Rubin | G06N 5/04 706/12 |
| 8,285,728 B1 | 10/2012 | Rubin | |
| 8,296,129 B2 | 10/2012 | Starkie | |
| 8,315,958 B1 | 11/2012 | Rubin et al. | |
| 8,447,720 B1 | 5/2013 | Rubin | |
| 8,768,869 B1 | 7/2014 | Rubin | |
| 9,299,025 B1 | 3/2016 | Rubin | |
| 9,330,358 B1 | 5/2016 | Rubin | |
| 9,396,441 B1 | 7/2016 | Rubin | |
| 9,436,912 B1 | 9/2016 | Rubin | |
| 9,449,280 B2 | 9/2016 | Rubin | |
| 9,471,885 B1 | 10/2016 | Rubin | |
| 10,242,130 B2 | 3/2019 | Samuel et al. | |
| 10,275,906 B2 | 4/2019 | Tung et al. | |
| 2019/0171438 A1 | 6/2019 | Franchitti | |

OTHER PUBLICATIONS

S. Rubin et al., "KASER: Knowledge Amplification by Structured Expert Randomization," IEEE, published Dec. 2004 (Year: 2004).*

Prentzas et al,, "Categorizing Approaches Combining Rule-Based and Case-Based Reasoning," Expert Systems 24 (2), pp. 97-122, May 2007.

Chaitin, G.J., "Randomness and Mathematical Proof," Scientific American, 232 (5), pp. 47-52, 1975.

Rubin, S.H., et al., "KASER: Knowledge Amplification by Structured Expert Randomization," IEEE Transactions on Systems, Man, and Cybernetics, vol. 34, No. 6 (Dec. 2004), pp. 2317-2329.

Rubin, S.H., "On Randomization and Discovery," J. Information Sciences vol. 177, No. 1, pp. 170-191, 2007.

Hosseini, H. et al., "Deep Neural Networks Do Not Recognize Negative Images," work was supported by ONR grantsN00014-14-1-0029 and N00014-16-1-2710, ARO grant W911NF-16-1-0485, and NSF grant CNS-1446866, (2017), pp. 1-3.

Hosseini, H. et al., "Deceiving Google's Perspective API Built for Detecting Toxic Comments," arXiv:1702.08138, Feb. 2017.

Mendel, J.M., "Computing with Words: Zadeh, Turing, Popper and Occam," IEEE Computational Intelligence Magazine, 2007, pp. 10-17.

Rubin, S.H., "Computing with words," IEEE Transactions on Systems, Man, and Cybernetics, Part 8 (Cybernetics), vol. 29, Issue 4 (1999), pp. 518-524.

Rubin, S.H., et al., "On the Role of Informed Search in Veristic Computing," IEEE Transactions on Systems, Man, and Cybernetics Int'l Conference (Oct. 2001), pp. 2301-2308.

Rubin, S.H., et al,, "Field-Effect Natural Language Semantic Mapping," IEEE Transactions on Systems, Man, and Cybernetics Int'l Conference (Oct. 2003), pp. 2483-2487.

* cited by examiner

Let situations, a = flaps down, b = engine speed high, c = taxiing, d = stick back, e = high energy expended, f = climbing, g = prepare for takeoff Let actions, w = throttle open, x = fuel burn-rate high, y= takeoff, z = gain altitude (z z = gain much altitude)

Next, consider the following LHS Equivalence Transformations and how they combine to create a LHS Randomization.
b c ⟹ f, g (taxiing and engine speed high ⟹ climbing; probability = certain; why? because prepare for takeoff)
d e ⟹ f, g (stick back and high energy expended ⟹ climbing; probability= certain; why? because prepare for takeoff)
LHS Randomization: b c ⟹ d e, where this is directed (taxiing and engine speed high ⟹ stick back and high energy expended; probability = certain)

a e ⟹ g (flaps down and high energy expended ⟹ prepare for takeoff; probability = likely)
c ⟹ g (taxiing ⟹ prepare for takeoff; probability = possible)
LHS Randomization: a e ⟹ c, where this is directed (flaps down and high energy expended ⟹ taxiing; probability = possible, as it could be landing)

Next, consider the following RHS Equivalence Transformations and how they combine to create a RHS Randomization.
a, z ⟹ x y (flaps down ⟹ fuel burn-rate high for takeoff; probability = certain; why? to gain altitude)
a, z ⟹ z (flaps down ⟹ gain altitude; probability = likely; why? to gain altitude)
RHS Randomization: x y ⟹ z, where this is directed (fuel burn-rate high, takeoff ⟹ gain altitude; probability = likely, as it could be for speed)

b ⟹ z z (engine speed high ⟹ gain much altitude; probability = likely, as it could be for speed)
b ⟹ wx (engine speed high ⟹ throttle open, fuel burn-rate high; probability = certain)
RHS Randomization: z z ⟹ w x, where this is directed (gain much altitude ⟹ throttle open, fuel burn-rate high; probability = likely, as it could be inertia)

Let the initial context be, a b c (flaps down, engine speed high, taxiing; probability = certain)
Next, randomize this context using the first LHS Randomization, which results in, a d e (flaps down, stick back, high energy expended; probability = certain)
Next, randomize this context using the second LHS Randomization, which results in c d (taxiing, stick back; probability = possible)
This randomized context has a covering in the rule base, which for demonstration purposes produces the action sequence x y z (fuel burn-rate high, takeoff, gain altitude)
Next, randomize this action sequence using the first RHS Randomization, which results in z z (gain much altitude; probability = likely)
Next, randomize this action sequence using the second RHS Randomization, which results in w x (throttle open, fuel burn-rate high; probability = likely)
Thus, if c d (taxiing and stick back), then w x (throttle open, fuel burn-rate high), where the initial probability of this randomized rule being valid is min (possible, likely) = possible.
Here, the probability may be updated to likely, which will update all probabilities involving this rule.
This too reflects how humans learn to fly, although, it will seem to be second nature to experienced pilots.
Note that the LHS and/or RHS Randomizations may similarly have their probabilities updated, if appropriate, with similar side effects. Probabilities may also be updated experientially.

FIG. 3

TRANSFORMATIONAL RANDOMIZATION FOR ENHANCED ARTIFICIAL INTELLIGENCE CAPABILITIES AND DIAGNOSTIC TUTORING

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac t2@navy.mil. Reference Navy Case No. 108038.

BACKGROUND

Conventional systems for natural language processing may focus on many different aspects. For example, Chomsky developed a grammatical hierarchy (e.g. a hierarchy of classes of formal grammars). However, randomization has been addressed more recently. It is one thing for a Type 0 grammar to be sufficient to capture variations found in natural language usage and another to be able to exploit regularities in natural language usage. The latter may enable speakers to learn the proper use of natural language experientially. It has been stated that, currently, computers are lacking in any capability for commonsense reasoning.

Deep learning and hidden layer neural networks are currently in wide use for many different scenarios. However, neural networks may not integrate (randomize) fundamental memories, and training is NP-hard. Not only are hidden layer neural networks incapable of modus ponens, but they may be incapable of commonsense reasoning.

Deeper learning derives from randomization theory. Randomization is an effective process for reducing information to an approximate minimal form. For example, a sequence of numbers may be referred to as being random because the length of the sequence approximates that of its most compact recursively enumerable (known) generator. Furthermore, according to Chaitin, a series of numbers may be said to be random, if the smallest algorithm capable of specifying it to a digital computer has about the same number of bits of information as the series itself. A random series of digits is one whose complexity is approximately equal to its size in bits. Since complexity has been defined as a measure of randomness, no number can be effectively proved to be random unless the complexity of the number is less than that of the system itself.

Despite the power of deep learning methods, they still lack much of the functionality for realizing strong artificial intelligence (AI). Deep learning, a set of techniques used for learning in neural networks, is lacking in a number of ways. For example, deep learning cannot be used to find causal relationships or perform logical inferences. Nor can deep learning be used to integrate abstract knowledge, such as what objects are for and how they are used. In other words, neural networks cannot reason.

Deep learning may use one or more hidden layers to map distinct input vectors to their trained definitions. Randomization theory implies the extraction of common properties (features) and filtering these sets for saliency. Deep learning alone does not account for this. Furthermore, it would be laborious and error-prone to attempt to manually extract these features (e.g., conventional computer vision techniques).

Randomization cannot be bounded, i.e., in the limit, it must be the most efficient representation of knowledge, supporting the creation of new knowledge. The failure of neural networks to be capable of modus ponens limits their capability to not only induce knowledge, but to even deduce it. It follows that no matter how well deep learning performs on pattern recognition problems, and despite its inherent intractability, it is mathematically trivial in solving general problems. The solution of such problems requires a strong artificial intelligence (AI), meaning that it needs access to domain-specific knowledge. It follows that a capability for symbolic reasoning (e.g., modus ponens) is needed to realize the unbounded density of knowledge.

With regard to representations, techniques for Knowledge Amplification with Structured Expert Randomization (KASER) are discussed in U.S. Pat. No. 7,047,226, to Rubin, S. H., which issued May 16, 2006, hereby incorporated by reference herein in its entirety ("'226 patent" hereinafter). As discussed therein, randomization theory holds that the human should supply novel knowledge exactly once (i.e., random input) and the machine extend that knowledge by way of capitalizing on domain symmetries (i.e., expert compilation). In the limit, novel knowledge may be furnished only by chance itself. The term "randomization" generally as used herein, is further discussed in Chaitin, G. J., "Randomness and Mathematical Proof," Scientific American, 232 (5), pp. 47-52, 1975 ("Chaitin" hereinafter), and in Rubin, S. H., "On Randomization and Discovery," J. Information Sciences, Vol. 177, No. 1, pp. 170-191, 2007 ("Rubin 2007" hereinafter).

SUMMARY

According to one general aspect, actions may be automatically determined by a machine learning system using transformational randomization. A situation set and an action set associated with contexts of a computer-implemented application may be obtained. Left-hand side (LHS) equivalence transformations and right-hand side (RHS) equivalence transformations are obtained based on a set of a plurality of rules for the application. LHS randomizations are obtained based on combining the plurality of LHS equivalence transformations. RHS randomizations are obtained based on combining the plurality of RHS equivalence transformations. A randomized context is obtained based on the LHS randomizations, and an action sequence is determined based on the context randomization. A randomized action sequence is obtained based on the RHS randomizations. A valid action is determined based on a probability value of a randomized rule associated with the randomized action sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIG. 3 illustrates a depiction of enhanced artificial intelligence capabilities and diagnostic tutoring.

DETAILED DESCRIPTION

Example techniques discussed herein may enable the use of natural language for the representation and replay of knowledge. Moreover, these techniques may enable the symmetric recall and use of sentential forms so that all learning pertains to idiosyncratic sentential forms and/or novel conceptual knowledge. This capability, to address natural language from a randomization perspective, enables conversational computing, thereby mitigating the impedance mismatch between the human and the machine for the mutual benefit of both. Example techniques discussed herein may put natural language on a computational basis, which has not been successfully addressed since Chomsky's grammatical hierarchy. Putting natural language on a randomization basis shows that commonsense may be the result of symmetric equivalence transformations and acquiring relatively random knowledge.

Figure 1:
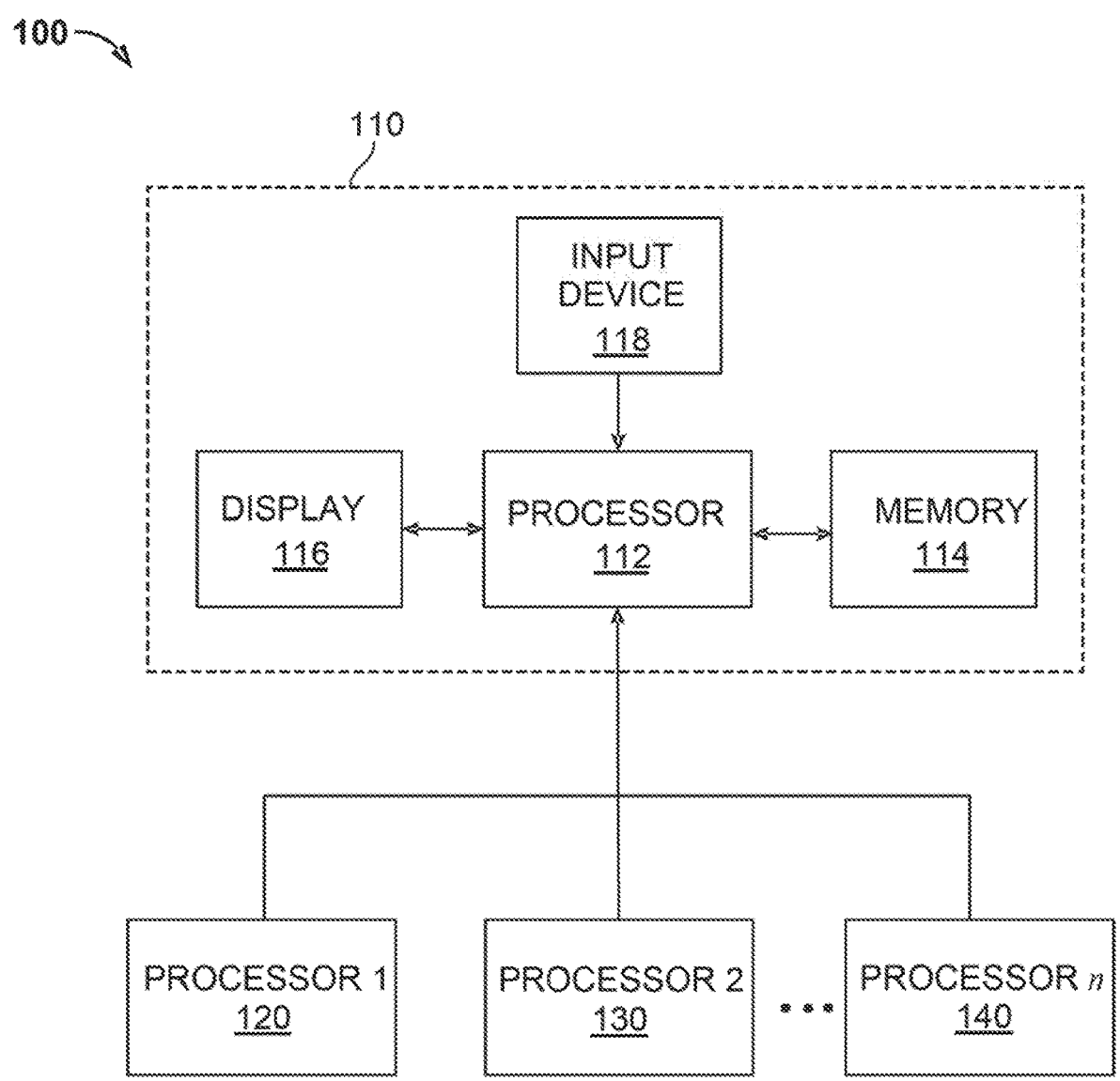
FIG. 1 is a block diagram of an embodiment of a distributed processor system.

FIG. 1 is a block diagram of an embodiment of a distributed processor system 100 in accordance with example techniques discussed herein. For example, the speed of a system, as discussed herein, may be increased through the use of associative memory and/or parallel (distributed) processors, such as shown in FIG. 1.

System 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximal processing capabilities may be achieved.

As discussed above, neural networks may not integrate (randomize) fundamental memories, and training is NP-hard. The first problem may be addressed by replacing hidden layer weights with transformation rules, mapping a set of input vectors to a desired corresponding set of output vectors. The second problem is a result of the fact that each addition to the set of input vectors requires that the hidden layer be recalculated for all of the vectors to be mapped. Herein, non-monotonic equivalence and substitutive transformations may be iteratively applied to a rule base to search out a space of semantically equivalent or analogous virtual rules. Transformations may be hill climbed, using a most-specific-first agenda mechanism, to keep the search time $O(m*n)$, where m is the number of rules in the average segment and n is the size of the average rule situation. Rule bases may be segmented on the basis of sharing a right-hand side (RHS) or sharing a left-hand side (LHS).

Transformations may be iteratively applied across multiple segments. The result is a virtual rule space>>actual rule space. Virtual rules are cached to save on the time required to re-compute them. Transformations may be assigned probabilities of correctness, where composition may imply taking the dynamic minimum probability. Squelches may be set to prune relatively improbable transformations or results of transformation and yield veristic explanations. The use of squelches and some form of constraint checking (e.g., non-deterministic mapping by some minimal number of distinct transformational pathways) may enable unsupervised learning. Using hidden-layer neural networks, the computation of the weights may be effected initially in parallel, but the final weights may be serially computed. Transformational randomization, by contrast, may be continually amenable to massively parallel computation. Enhanced artificial intelligence capabilities represent an intelligent response to a general query. Generally, artificial intelligence capabilities refer to capabilities to intelligently understand what a human being is intending. As an example, artificial intelligence capabilities may include capabilities (e.g., of a device) to respond intelligently to spoken and/or typed requests on board a ship to operate as a human being would in a battle theater. In order to do that, a device may need a capability to interpret and otherwise understand the semantics of a natural language (NL) spoken or typed query (e.g., a capability to intelligently understand what a human being is intending).

Transformational randomization (TR) may map NL queries to composed and parameterized database functions. These functions may be spirally developed through reuse, transformation, and integration; and, they may realize everything from Structured Query Language (SQL) queries to directed data mining. Tracing tutors (TT) may enable the path through a sequence of instructional modules to be determined by diagnostic questions. There are an exponential number of candidate paths. TR enables a provided basis set of such paths to be amplified to yield an analogous set of dependent paths for more capable and cost-effective tutors. It may be noted that hidden layer neural networks are incapable of this.

Any capability for the intelligent translation of an NL query into an effective database search may be knowledge based (i.e., as contrasted with a closed algorithm). As such, a continual, never-ending spiral development is used.

TR may imply self-referential rule base transformations, which can process Type 0 languages, such as NL. This amplifies the rule base and creates a virtual rule space>>the actual rule space. Each rule may have the format:

conjunction of NL sequences→functional action (DB, params).

Answers may be associated with bound errors of inference—expressed as probabilities and/or veristic possibilities, as discussed below. Rule bases may be iteratively acquired through randomization transformations. A most-specific agenda mechanism may be used. Rules may be non-deterministic and free of subsumption (i.e., always triggering an equivalent more-general form). Databases may be segmented by content with views based on applicative use.

Action functions may perform coherent searches of specified databases (e.g., for C2 applications). Again, database software may be spirally developed under a development environment geared towards reuse, transformation, and integration. Segment specification and associated parameter lists may serve to make the functional action as general as is practical. Action functions may output a non-deterministic NL semantic echo for validity checking and an answer in non-deterministic NL. They may also query a system database or ask a user questions in support of non-monotonic processes. Query results may serve to cover at least one (virtual) rule situation or the query will need to be answered by the user with attendant software development for subsequent automation.

The closest-matching action functions may be retrieved by a second TR system, which maps the NL situation to a keyword set. This non-deterministic retrieved function is then attached to the situation to form a new rule, or it is modified to create a new symmetric function and then attached.

TR is an advantageous enabler for enhanced artificial intelligence capabilities. Artificial intelligence capabilities may grow faster than the supplied knowledge, which may imply that the cost-effectiveness of realization may be a function of scale.

Tracing tutors are discussed below. With a tracing tutor, a student may be presented with an instructional sequence (e.g., using videos), which may also include text and questions. At articulation points, the student is presented diagnostic questions. The answers to these questions, along with the student's resume, interests, curriculum enrollment, best learning modalities, etc., determines the non-deterministic best next module in the training sequence. There are an exponential number of candidate paths. TR may enable a provided basis set of such paths to be amplified to yield an analogous set of dependent paths for more capable and cost-effective tutors. Hidden layer networks are incapable of this. In this manner, the student is not lost and need not be bored.

There may be ten choices for question one, ten for question two, ten for question ten and beyond, thus creating a space of over ten billion diagnostic exemplars. It is not cost-effective to attempt to humanly provide a complete best next training module given that large (or larger) an exemplar space.

In accordance with example techniques discussed herein, some answers may be provided by supervised or unsupervised training, which comprises a basis of knowledge and let the KASER, or transformational randomizer, amplify this basis to cover many dependent vectors. A probability/possibility of correctness may also be provided, which can be squelched to provide a machine-selected training module. This is the case, even though the system may never have experienced this situation. The capability may be advantageous for instructional domains for which rigid independent rules may not be the ideal way to learn (e.g., for decision support, tactical flight control, even battle management). For example, it may not be needed for teaching linear algebra or the LISP programming language, since effective tutors are available for that. However, this ignores a potential need for teaching the student to select pivot points for equational solving, or how to find integrating factors for the solution of differential equations, or anything involving humans in the loop (e.g., proper software documentation).

The student creates the instructional traces. The acquisition of these traces may be supervised for small-scale tutors and/or may be unsupervised using data analytic technologies (e.g., directed data mining) given non-deterministic learning and/or a large number of students. No existing AI technology, other than the KASERs, can effectively expand the space of instructional traces and bound the error in so doing. Knowledge acquisition may be the most-costly part of AI system development, which may explain why tracing tutors are not more widely used. As an example, if a teacher teaches a student an arbitrary game and tells the student that three in the middle column, or three in the first row, or three in the second row is a win, unlike a computer program, the student may be likely to suggest that three in the third row is a win and with bounded error. KASER technologies can do this, which may make tracing tutors practical. When they are wrong, they may learn a correction for the relatively random knowledge and, similarly as a human, learn more than what they were taught, or symmetric knowledge—for supra-linear learning. The more intelligent the system (greater the capability for randomization), the greater that supra-linearity may be, on average.

Tracing tutors, enabled by supra-linear learning, may enable spiral development. Thus, they may work with a small database of objects, which may be iteratively improved and augmented. This may mirror how humans iteratively deepen their understanding and its associated details as they learn. Such tutors may remove the impedance mismatch between the way in which the student learns and the way in which the machine learns, which may provide for a symbiosis of human and machine. For a simple example, a commercial pilot who erroneously suggests that it is safe to pull full-flaps to reduce airspeed in flight may be mapped to a video module, which shows the results of over-extending the angle of attack to reduce airspeed along with the verbal/textual overlay stating that stall-speed is dangerous and must be avoided. It may be noted that the jet pilot has supra-linearly learned to be wary of fuel levels too through this training exercise (i.e., lest they run out of fuel and ultimately crash). The TT technology does not just teach—it may operate similarly to the brain to ensure efficient learning, by the student, of the literal as well as the conceptual material. In contrast, other artificial intelligence (AI) systems (e.g., expert systems) may be hand-crafted to imitate this behavior, but they may not efficiently scale. The TT may be scalable to increase the versatility of the space of training modules, thereby improving the quality of the learning experiences obtained through its use.

TTs may potentially integrate with tutoring technologies, which are knowledge based. The TT is potentially the most cost-effective intelligent tutor. If the knowledge base is segmented, the cost effectiveness may be even greater because segments can be shared across distinct application domains. This cost-containment phenomenon is attendant with scale and may advantageously provide an improved set of tutors.

In one aspect, the student may ask questions of the TT at any point using natural language within a training module, which will stack the current training, take them to one of thousands of candidate modules based upon all of the aforementioned context, supra-linearly learn corrections, and pop them back to the point of departure. The tutor may improve with experience, the content may be seamlessly and spirally developed, and the cost of educational delivery itself may supra-linearly decrease with scale. Akin to a RISC computer architecture, sometimes technical improvements in one critical component will lead to a transformation of other components and result in a conceptually simpler, albeit more capable system, which may be the case for the TT.

An example essence of intelligence is the ability to predict. Transformation is beneficial (e.g., the principle of duality in projective geometry states that one can interchange point and line in a theorem about figures lying in one plane and obtain a meaningful statement). An example application is to increase system safety and reliability by generalizing conditions leading to critical failures and report the probabilities in a prognostic manner. The input may be reams of data, from which situation-action rules may be mined by direction.

Achieving this capability to predict, may need the unsupervised extraction of valid context-sensitive equivalence transformations, which lead to the creation of valid symmetric rules. These transforms may be applied through a search paradigm to create symmetric non-deterministic predictive rules for unknown situations, which may be likely to be encountered. These symmetric rules represent a virtual rule space>>actual rule space. Semantics are represented through the use of non-deterministic NL syntax, which is subject to equivalence transformations, wherever applicable.

This methodology may spirally develop an ever-deeper semantic knowledge base. Thus, somewhat similarly to human knowledge, it may be heuristically usable from the start. It does not burden the user, which differs from property-based question/answer (Q/A) methods. With unsupervised learning, an unknown non-deterministic image survives just in case it can be created by some minimal number of distinct transformational pathways.

The transformational descriptive virtual rule space methodology follows. First, cases are acquired through the use of NL. They may be converted into rules through the transformative substitution/deletion of predicates, which follows. Predicate sets and sequences, and their generalizations, are extracted into user-defined hierarchies (i.e., through rules) for a randomization. Fired rules are logically moved to the head of the cache. Unlike the KASER, learning is mostly unsupervised. Probabilities and their interpreted possibilities may be experientially-based and/or user-based. Results may be displayed numerically as probabilities and/or veristically as possibilities through a table lookup. The use of squelches and some form of constraint checking (e.g., non-deterministic mapping by some minimal number of distinct transformational pathways) enables unsupervised learning.

Examples of symmetric learning are discussed below. Initial probabilities follow from the ratio of the number of correct rule firings. The probability of a substitution being valid is the dynamic minimum of the probabilities of correctness. For example, rules may be expressed as:

R1: (car will not start) and (lights will not operate)→(check the battery) 99%

R2: (car will not start) and (horn will not operate)→(lights will not operate) 98%

By substituting R2 into R1, where R1 may instead hold (lights remain off)—see below, and substitutions are made from RHS (post-conditions) to LHS (i.e., preconditions):

R3: (car will not start) and (car will not start) and (horn will not operate)→(check the battery) 98% (i.e., min (0.99, 0.98))

E1: X and X (LHS)=X 100% (It may be noted that such randomization may or may not be an intermediate step, but if not is a final step.)

By applying equivalence transformation E1 to R3 R4 may be obtained:

R4: (car will not start) and (horn will not operate)→(check the battery) 98% (i.e., min (100%, 98%))

If this rule were available to a user from the start, or as the result of an equivalence transformation, then the following step would be immediate, by substitution of R4 into R1:

E2: (car will not start) and (lights will not operate)=(car will not start) and (horn will not operate) 98% (i.e., min (99%, 98%))

R5: (car will not start) and (lights are bright)→(the tank is empty) 75%

R6: (car will not start) and (lights are bright)→(the fuel line is clogged) 25%

The probabilities for this non-deterministic rule may need to sum to unity. Equivalence rules, such as (lights are bright)=(horn is loud), may also be operative and may be used to bring the LHSs into equivalence. Transitivity is only augmented (i.e., $a{\rightarrow}b$ and $b{\rightarrow}c{\Rightarrow}a{\rightarrow}c$) for purposes of caching. By substituting R6 into R5, the following equivalence rule is obtained:

E3: (the tank is empty)=(the fuel line is clogged) 25% (i.e., min (75%, 25%)).

Principles of symmetric learning follows.

a. Rule Substitution:

Ri: $a{\wedge}d'{\rightarrow}c|pRi$

Rj: $u{\wedge}v{\rightarrow}d''|pRj$

→

Rk: $a{\wedge}u{\wedge}v{\rightarrow}c|pRk=\min(pRi, pRj)$, where $d'=d''$

Rk': $a{\wedge}v{\rightarrow}c|pRk'=\min(100\%, pRk)=pRk$, where $a=u$

If this rule had been available from the start, or as the result of an equivalence transformation, then the formation of Ej would be immediate.

Rm: $a{\wedge}e{\rightarrow}f|pRm$

Rn: $a{\wedge}e{\rightarrow}g|pRn$, where $pRm+pRn=1.0$ and equivalence rules (e.g., $e=h$), may also be operative and may be used to bring the LHSs into equivalence. Transitive rules are only acquired for purposes of caching. By substituting Rn into Rm, the equivalence rule, Ek may be obtained:

b. Equivalence Rules:

Ei: $W{\wedge}W{\rightarrow}W|pEi=100\%$

Ej: $a{\wedge}d'=a{\wedge}v|pEj=\min(pRi, pRk')$

Ek: $f=g|pEk=\min(pRm, pRn)$

Such equivalence transformations may be situational conjuncts (i.e., LHS) or action sequences (i.e., RHS). Transforms are also used to establish the semantic equivalence of situational and action NL text, including equating between the two for use in transformative substitution, which ties the two sides together. For example, (lights remain off) LHS← →RHS (lights will not operate), where the LHS is a situational conjunction and the RHS is an equivalent action sequence. Equivalence and substitutive transformations are also subject to appropriate (i.e., LHS or RHS) equivalence transformations. Substitutive probabilities are evaluated as they are for equivalence transformations. LHS← →RHS substitutive transformations may also be combined to create LHS=LHS and RHS=RHS equivalence transformations, as discussed below. For example, this may be done on an MPP at random to hill climb a most-specific match for the context. Rule bases are segmented on the basis of sharing a RHS or sharing a LHS. Not only does this enable the immediate formation of LHS=LHS and RHS=RHS equivalence transformations, respectively; but, by embedding a RHS in a LHS, or a LHS in a RHS, the formation of symmetric (e.g., transitive) rules is enabled. Thus, the same randomized (i.e., minimal) rule, and equivalence transformations, may be iteratively applied across multiple segments. Redundant rules, which are equivalent under transformation, may also be stored in a cache to save time on search to re-create them and may fall off of the cache due to non-use as other rules are acquired at, or moved to, the logical head. This may be accomplished using a move-to-the-head upon acquisition or exercise paradigm.

Search among LHS contextual substitutions is intended to fire a most-specific rule using a previously unmatchable context. Using hill-climbing for LHS contextual substitutions, transformations may only be taken if they increase the maximum percentage of covered predicates at each step. Random search (e.g., among non-deterministic alternatives) may vary the order and thus the transforms participating in such transformative substitutions. Search among RHS substitutions is intended to create non-deterministic actions. Using hill-climbing for RHS substitutions, transformations may only be taken if they decrease the number of steps in the action sequence. Again, random search may vary the order and thus the transforms participating in such (non-deterministic) transformative substitutions. Probabilistic evaluations may be used to squelch equivalence and transformative substitutions and/or similarly, the firing of rules. Possibilistic evaluations may provide the veristic likelihood of a proposed action. Non-covered (i.e., fuzzy) situations may not be fired because to do so may enable an unacceptable error creep. For example, omission of the word, "not" complements the semantics.

Erroneous rules and transforms are identified through the explanation subsystem. Erroneous rules may be corrected through replacement or the acquisition of a correct more-specific one, as appropriate. Erroneous transforms are expunged, and they are allowed to properly reform on their own through system exercise.

Figure 2:
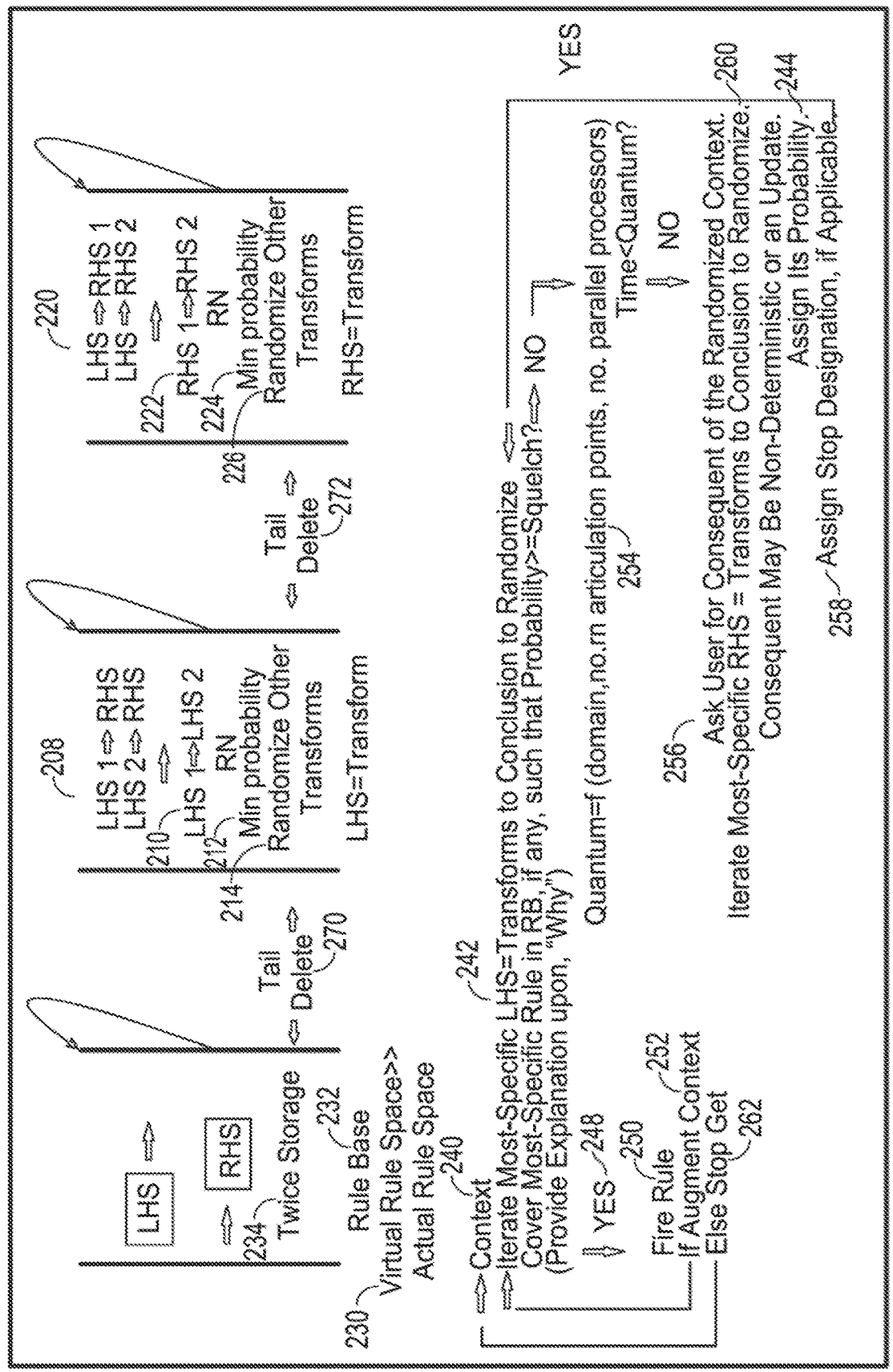
FIG. 2 illustrates an example algorithm for transformational randomization that may reside on the system shown in FIG. 1

FIG. 2 illustrates an example algorithm in accordance with example techniques discussed herein. As shown in FIG. 2, cases may be defined to be rules with extraneous predicates. They may be randomized through the iterative application of most-specific equivalence transforms. The result may be expressed in any consistent form (e.g., NL, predicate calculus, et al.).

Squelches are pre-defined cutoff thresholds. Probabilities and their interpreted possibilities may be experientially-based and/or user-based. Experiential probabilities follow from the ratio of the number of correct to the total number of rule firings over a defined most-recent interval, which makes sense for the application domain. Results may be displayed numerically as probabilities and/or veristically as possibilities through a table lookup. Possibilistic evaluations give the veristic likelihood of a proposed action. Rule firings accompanied by probabilities/possibilities are subject to squelch.

As shown in FIG. 2, whenever a RHS randomization is completed, the rule base is checked for all distinct rules having the same RHS (208). For each one found, if any, create the strictly randomizing equivalence transform, LHS→LHS (210). The associated probability is the minimum of the inducing rule pair (212). If it is subsequently found to be previously unknown, it is appended to the logical head of the list of LHS equivalence transformations. New transforms are iteratively applied to randomize the LHS rule base (214) as well as the other LHS equivalence transforms, which can become superfluous id transforms in the process. Fired LHS equivalence transformations are also moved to their logical list head.

Whenever a non-deterministic rule is acquired (i.e., rules having the same LHSs) (220), create the strictly randomizing equivalence transform, RHS→RHS (222). The associated probability is the minimum of the inducing rule pair (224). If it is subsequently found to be previously unknown, it is appended to the logical head of the list of RHS equivalence transformations. New transforms are iteratively applied to randomize the RHS rule base as well as the other RHS equivalence transforms (226), which can become superfluous id transforms in the process. Fired RHS equivalence transformations are also moved to their logical list head.

More-specific contexts and/or action sequences (i.e., containing causal "because" factors) correct otherwise would-be errors of transformation by inducing more-specific transformations. Causal factors are replayed upon issuance, by the user, of the why query (e.g., if cold dress warm or go inside where it is warm). The response to the why query for go inside may be, because it is warm. The probability is iteratively the minimum of the existing probability and the probability of the applied transform. The probability of the arbitrarily selected most-specific transform may not fall below the set squelch. Resultant validated distinct rules are acquired at, or moved to, the logical head of the rules list, which may function as a cache. The virtual (transformed) rule space>>actual rule space (230). Rule bases (232) are segmented on the basis of sharing a LHS or RHS to enable massively parallel processing (MPP). Thus, rules will be stored twice (234), in the limit.

L3: Read NL context (240).

L2: Iteratively apply most-specific LHS equivalence transforms within squelch, if any, at random to conclusion, which reduce the length of the context (242). The length of the context will decrease upon each transformation, or be a non-invertible transform (i.e., a strictly Type 1 hill-climbing grammar). The probability is the minimum of the existing probability and the probability of the applied transform(s) (244).

Find the most-specific rule covered by the randomized context, if any (246).

If a covered rule(s) is found (248), fire an arbitrary one (250) such that the probability is at least the set squelch, resolve conflict, if any, at random, and go to L1 (Note: Non-covered (i.e., fuzzy) situations may not be fired because to do so allows an unacceptable error creep.)

Else if a random selection needed to be made at L2, on the last iteration, and the elapsed time is less than the quantum (which is a function of the domain, the number of random articulation points, as well as the number of parallel processors) (254), go to L2

Else ask the user to supply a correct rule consequent (256), using the randomized context, and set the probability. The resultant probability must be at least the set squelch to be retained, else repeat. The consequent may be an update or non-deterministic. A special stop designation may ensure monotonicity, which means to fire the consequent and not augment/update the context with the results (258).

Iteratively apply most-specific RHS equivalence transforms within squelch, if any, at random to conclusion (260), which may reduce the length of the new consequent. The length of the consequent sequence will decrease upon each transformation, or be a non-invertible transform (i.e., a strictly Type 1 hill-climbing grammar). Again, the probability is the minimum of the existing probability and the probability of the applied transform(s). Go to L2.

L1: If the fired rule does not contain a stop designation, the context is augmented/updated (252) by the actions of the rule consequent, the probability is updated, and go to L2 (240).

Else go to L3 (262).

The size of all lists may be balanced through the use of tail deletion (270, 272). Un-fired redundant rules, which are equivalent under transformation, as well as un-fired rules substituted for by more-specific rules will fall off of the cache due to non-use as other rules are acquired at, or correctly fired and moved to, their logical list heads.

Rules created or found through LHS and/or RHS transformations are subject to error. That error may be minimized in proportion to the number of distinct transformational pathways by which the same (or other) rule can be (re)created or found using a parallel search. The associated probability is the maximum of the found probabilities for the discovered transformational pathway(s).

FIG. 3 illustrates a depiction of enhanced artificial intelligence capabilities and diagnostic tutoring. The depiction of FIG. 3 is based on situations and actions relating to an airplane in takeoff mode (e.g., flaps down, taxiing, stick back). LHS equivalence transformations may be combined to create LHS randomizations, and RHS equivalence transformations may be combined to create RHS randomizations. Contexts are randomized using the LHS randomizations to determine action sequences. An action sequence is randomized using the RHS randomizations, and probabilities are analyzed and updated.

Example techniques discussed herein may provide the following advantageous features. It is noted that there may be many more advantageous features than are listed below.

(a) The system may randomize natural language to make possible the amplification of commonsense knowledge.

(b) The system may automatically extract LHS and RHS equivalence transformations.

(c) The system may ascribe a probability to each chunk of knowledge it acquires.

(d) The system may use a dynamic squelch to prune any improbable knowledge.

(e) The system may allow for the use of massively parallel processing to find the most probable knowledge.

(f) The system may learn idiosyncratic expressions and novel concepts through the extraction of symmetry, leaving a random residue.

(g) The system may randomize cases to create more salient rules.

(h) The system may hill-climb most-specific transformations for rapid recognition.

(i) The system may cache knowledge and employ tail deletion to retain the most-valuable knowledge.

(j) The system may segment the knowledge base so that no rule may be more than duplicated in storage for a more than double speedup of its processing algorithms.

(k) The system may create a virtual rule space>>actual rule space.

(l) It has been demonstrated that deep learning was not even capable of recognizing the Polaroid negative of the number "3"—despite being extensively trained on the image, "3". The system discussed herein may learn through transformation and thus would not experience this problem.

(m) The system may enable the computation of the enhanced artificial intelligence capabilities—an intelligent response to a general query.

(n) The enhanced artificial intelligence capabilities may grow faster than the supplied knowledge, which may imply that the cost effectiveness of realization may be a function of scale. That scale however is unbounded.

(o) The system may enable tracing tutors, which enable the path through a sequence of instructional modules to be determined by diagnostic questions.

(p) The system may enable a provided basis set of training paths to be amplified to yield an analogous set of dependent paths for more capable and cost-effective tutors.

(q) In tutoring, transformational learning, by the system, translates over into domain-transference by the student. Thus, in applying AI to tutoring, the system may stand alone in its educational capability.

(r) Tracing tutors, enabled by supra-linear learning, enable spiral development.

(s) If the knowledge base is segmented, the cost effectiveness of transformational tutors may be even greater, because segments may be shared across distinct application domains.

(t) The system may enable the realization of an unbounded density of symmetric knowledge through the use of equivalence randomization transforms.

(u) Removing symmetric knowledge leaves a potential unbounded density of random knowledge, which is a side effect of the use of equivalence randomization transforms.

(v) Action functions may perform coherent searches of specified databases (e.g., for C2 applications).

(w) The system may support software development and retrieval, which supports the creation of effective situations and actions.

(x) Unlike the techniques discussed herein, hidden-layer neural networks cannot amplify knowledge symmetrically. Thus, the system may hold substantial promise for intelligent reasoning that is open under deduction.

(y) Learning in transformational randomization is supra-linear because of the equivalence transformations, which are polynomial time because the correction of a rule and/or transform automatically propagates. By contrast, neural networks have at best linear learning because there is no domain transference, which is NP-hard if the net has at least one hidden layer.

(z) The system may provide an explanation capability tied to its LHS and RHS equivalence transformations. That is, a context, needed for the formation of accurate transformation rules, also serves in response to the why query.

As an alternative to the discussion above, in accordance with example techniques discussed herein, natural language may be broken into symmetric and random components, and its understanding and use of natural language may depend upon the amplification of symmetric components. These components are extracted from cases having the same situations or actions. Further details may be used to ensure a proper match and may be replayed upon the user issuing a "why" command, for example, "why can a house be as good as a jacket if I'm cold?" The reply may include the detail, "the house is warm and the jacket keeps you warm". It is possible that symmetric transforms may be acquired directly through the application of knowledge, but this alternative may need more knowledge than the operant system has available; whereas, the techniques herein require no further knowledge. In addition, the system may search out transformative paths to get symmetric knowledge. If a massively parallel architecture were used, more such paths could be explored. On average, this would find more probable symmetric transforms and thus potentially provide a system of greater utility. Furthermore, if natural language is used to index a database and/or drive effective procedures, then the resultant systems would not only be user friendly, conversational, and able to learn natural language, but they would serve to further bridge the divide between human and machine understanding.

Example aspects discussed herein may be implemented as a series of modules, either functioning alone or in concert with physical electronic and computer hardware devices. Example techniques discussed herein may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 4:
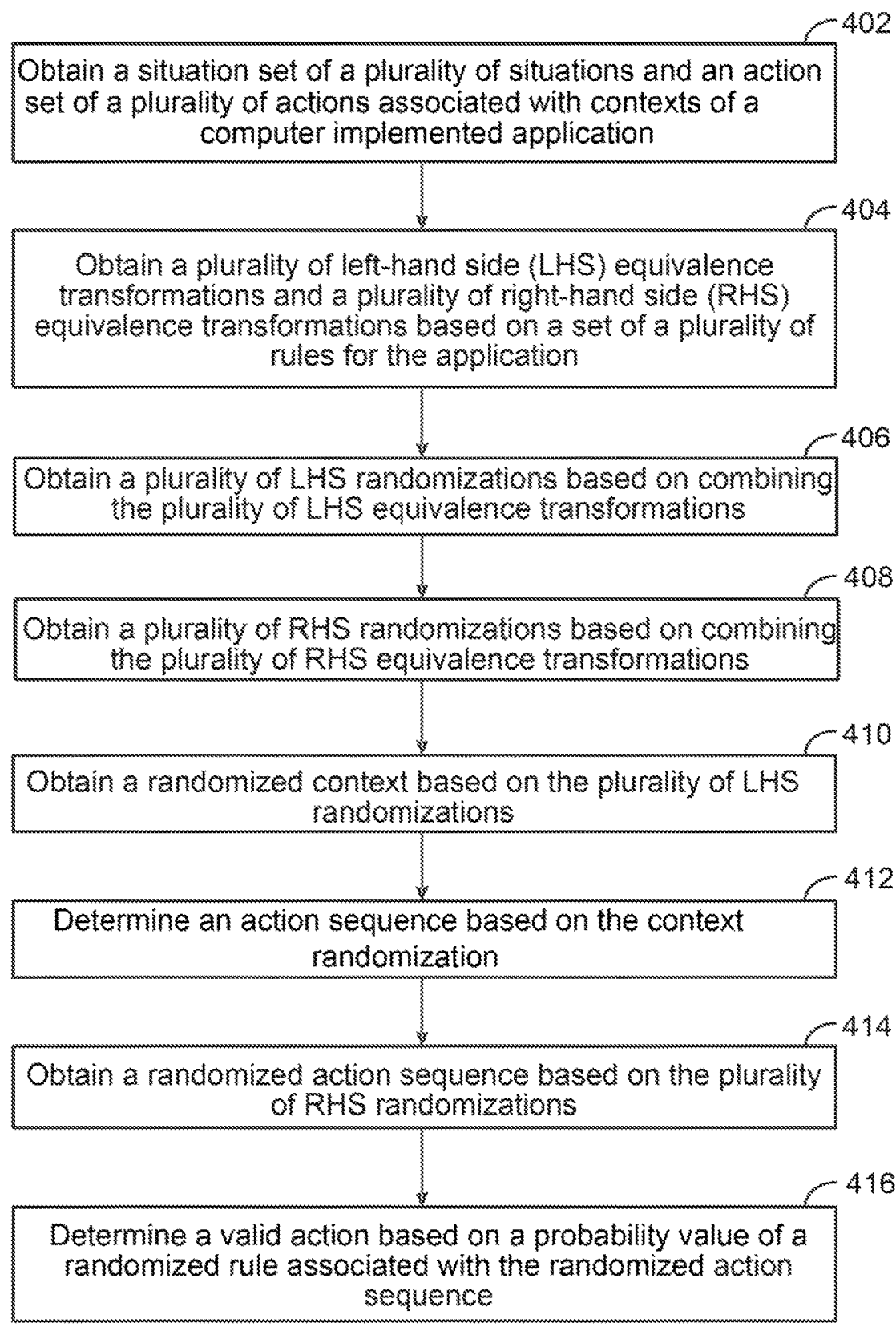
FIG. 4 is a flowchart illustrating transformational randomization.

FIG. 4 is a flowchart illustrating example operations of the system of FIG. 1, according to example embodiments. As shown in the example of FIG. 4, a situation set of a plurality of situations and an action set of a plurality of actions associated with contexts of a computer-implemented application may be obtained (402). For example, a situation set, covered by a most-specific context, and an action sequence associated with a computer-implemented application may be obtained.

A plurality of left-hand side (LHS) equivalence transformations and a plurality of right-hand side (RHS) equivalence transformations be obtained based on a set of a plurality of rules for the application (404).

A plurality of LHS randomizations may be obtained based on combining the plurality of LHS equivalence transformations (406). A plurality of RHS randomizations may be obtained based on combining the plurality of RHS equivalence transformations (408). A randomized context may be obtained based on the plurality of LHS randomizations (410). An action sequence may be determined based on the context randomization (412). A randomized action sequence may be obtained based on the plurality of RHS randomizations (414). A valid action may be determined based on a probability value of a randomized rule associated with the randomized action sequence (416).

For example, execution of the determined valid action may be initiated.

For example, obtaining the plurality of LHS equivalence transformations may include determining a pair of rules, in the set of the plurality of rules that share a common LHS.

For example, obtaining the plurality of RHS equivalence transformations may include determining a pair of rules, in the set of the plurality of rules that share a common RHS.

For example, obtaining the plurality of LHS randomizations may include iteratively applying most-specific LHS equivalence transformations.

For example, obtaining the plurality of LHS randomizations may include iteratively applying most-specific LHS equivalence transformations, within a predetermined squelch value.

For example, the probability value may be determined as a minimum value of probabilities included in a set of values that include a prior probability value and a transformation probability value associated with a transformation of at least one of the left-hand sides.

One skilled in the art of computing will appreciate that many other types of techniques may be used for implementing techniques discussed herein, without departing from the discussion herein.

Features discussed herein are provided as example techniques that may be implemented in many different ways, which may be understood by one of skill in the art of computing, without departing from the discussion herein. Such features are to be construed only as example features, and are not intended to be construed as limiting to only those detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions, which may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method comprising:
automatically determining actions, by a machine learning system using transformational randomization, by:
obtaining a situation set of a plurality of situations and an action set of a plurality of actions associated with contexts of a computer-implemented application;
obtaining a plurality of left-hand side (LHS) equivalence transformations and a plurality of right-hand side (RHS) equivalence transformations based on a set of a plurality of rules for the application wherein LHS refers to a left hand side of a rule that indicates one or more preconditions and RHS refers to a right hand side of the rule that indicates one or more post-conditions caused by satisfaction of the preconditions;
obtaining a plurality of LHS randomizations based on combining the plurality of LHS equivalence transformations;
obtaining a plurality of RHS randomizations based on combining the plurality of RHS equivalence transformations;

obtaining a randomized context based on the plurality of LHS randomizations;
determining an action sequence based on the randomized context;
obtaining a randomized action sequence based on the plurality of RHS randomizations; and
determining a valid action based on a probability value of a randomized rule associated with the randomized action sequence wherein the valid action is further based on supervised or unsupervised training of a machine learning model.

2. The method of claim 1, further comprising initiating execution of the determined valid action.

3. The method of claim 1, wherein obtaining the plurality of LHS equivalence transformations includes determining a pair of rules, in the set of the plurality of rules, that share a common LHS.

4. The method of claim 1, wherein obtaining the plurality of RHS equivalence transformations includes determining a pair of rules, in the set of the plurality of rules, that share a common RHS.

5. The method of claim 1, wherein obtaining the plurality of LHS randomizations includes iteratively applying most-specific LHS equivalence transformations.

6. The method of claim 1, wherein obtaining the plurality of LHS randomizations includes iteratively applying most-specific LHS equivalence transformations, within a predetermined squelch value.

7. The method of claim 1, wherein the probability value is determined as a minimum value of probabilities included in a set of values that include a prior probability value and a transformation probability value associated with a transformation of at least one left-hand side.

8. A machine learning system comprising:
at least one hardware device processor; and
a computer-readable storage medium storing instructions that are executable by the at least one hardware device processor to:
obtain a situation set of a plurality of situations and an action set of a plurality of actions associated with contexts of a computer-implemented application;
obtain a plurality of left-hand side (LHS) equivalence transformations and a plurality of right-hand side (RHS) equivalence transformations based on a set of a plurality of rules for the application wherein LHS refers to a left hand side of a rule that indicates one or more preconditions and RHS refers to a right hand side of the rule that indicates one or more post-conditions caused by satisfaction of the preconditions;
obtain a plurality of LHS randomizations based on combining the plurality of LHS equivalence transformations;
obtain a plurality of RHS randomizations based on combining the plurality of RHS equivalence transformations;
obtain a randomized context based on the plurality of LHS randomizations;
determine an action sequence based on the randomized context;
obtain a randomized action sequence based on the plurality of RHS randomizations; and
determine a valid action based on a probability value of a randomized rule associated with the randomized action sequence wherein the valid action is further based on supervised or unsupervised training of a machine learning model.

9. The system of claim 8, wherein the instructions are executable by the at least one hardware device processor to initiate execution of the determined valid action.

10. The system of claim 8, wherein obtaining the plurality of LHS equivalence transformations includes determining a pair of rules, in the set of the plurality of rules, that share a common LHS.

11. The system of claim 8, wherein obtaining the plurality of RHS equivalence transformations includes determining a pair of rules, in the set of the plurality of rules, that share a common RHS.

12. The system of claim 8, wherein obtaining the plurality of LHS randomizations includes iteratively applying most-specific LHS equivalence transformations.

13. The system of claim 8, wherein obtaining the plurality of LHS randomizations includes iteratively applying most-specific LHS equivalence transformations, within a predetermined squelch value.

14. The system of claim 8, wherein the probability value is determined as a minimum value of probabilities included in a set of values that include a prior probability value and a transformation probability value associated with a transformation of at least one left-hand side.

15. A non-transitory computer-readable storage medium storing instructions that are executable by at least one hardware device processor to:
automatically determine actions, by a machine learning system using transformational randomization, by:
obtaining a situation set of a plurality of situations and an action set of a plurality of actions associated with contexts of a computer-implemented application;
obtaining a plurality of left-hand side (LHS) equivalence transformations and a plurality of right-hand side (RHS) equivalence transformations based on a set of a plurality of rules for the application wherein LHS refers to a left hand side of a rule that indicates one or more preconditions and RHS refers to a right hand side of the rule that indicates one or more post-conditions caused by satisfaction of the preconditions;
obtaining a plurality of LHS randomizations based on combining the plurality of LHS equivalence transformations;
obtaining a plurality of RHS randomizations based on combining the plurality of RHS equivalence transformations;
obtaining a randomized context based on the plurality of LHS randomizations;
determining an action sequence based on the randomized context;
obtaining a randomized action sequence based on the plurality of RHS randomizations; and
determining a valid action based on a probability value of a randomized rule associated with the randomized action sequence wherein the valid action is further based on supervised or unsupervised training of a machine learning model.

16. The non-transitory computer-readable storage medium of claim 15, wherein the instructions are executable by the at least one hardware device processor to initiate execution of the determined valid action.

17. The non-transitory computer-readable storage medium of claim 15, wherein obtaining the plurality of LHS equivalence transformations includes determining a pair of rules, in the set of the plurality of rules, that share a common LHS.

18. The non-transitory computer-readable storage medium of claim 15, wherein obtaining the plurality of RHS equivalence transformations includes determining a pair of rules, in the set of the plurality of rules, that share a common RHS.

19. The non-transitory computer-readable storage medium of claim 15, wherein obtaining the plurality of LHS randomizations includes iteratively applying most-specific LHS equivalence transformations.

20. The non-transitory computer-readable storage medium of claim 15, wherein the probability value is determined as a minimum value of probabilities included in a set of values that include a prior probability value and a transformation probability value associated with a transformation of at least one left-hand side.

* * * * *